2 Sheets—Sheet 1.

A. SMITH.
APPARATUS FOR RENDERING FATTY ANIMAL MATTER.

No. 99,252. Patented Jan. 25, 1870.

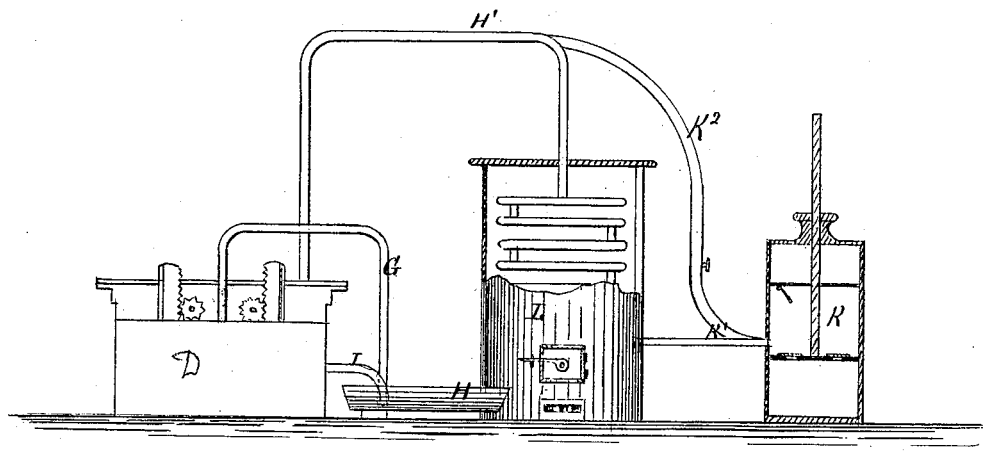

UNITED STATES PATENT OFFICE.

AMOR SMITH, OF BALTIMORE, MARYLAND.

IMPROVEMENT IN APPARATUS FOR RENDERING FATTY ANIMAL MATTER.

Specification forming part of Letters Patent No. 99,252, dated January 25, 1870.

*To all whom it may concern:*

Be it known that I, AMOR SMITH, of the city and county of Baltimore, and State of Maryland, have invented an Improved Apparatus for Rendering Fatty Animal Matter; and I do hereby declare that the following is a full, clear, and exact description thereof, reference being had to the annexed drawings, making part of this specification, in which—

Figure 1:
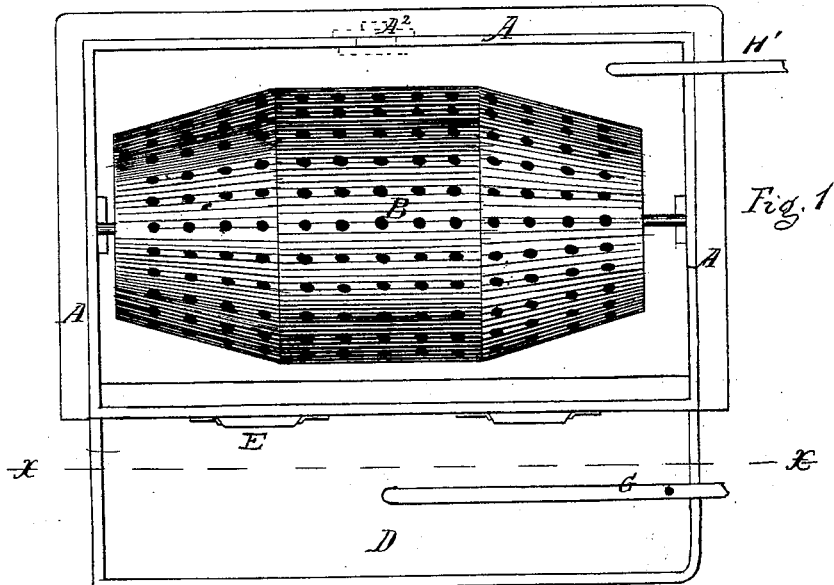
Figure 2:
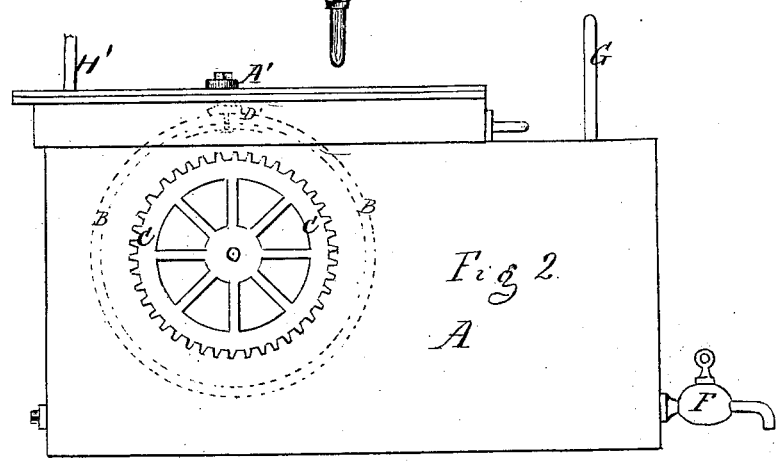
Figure 3:
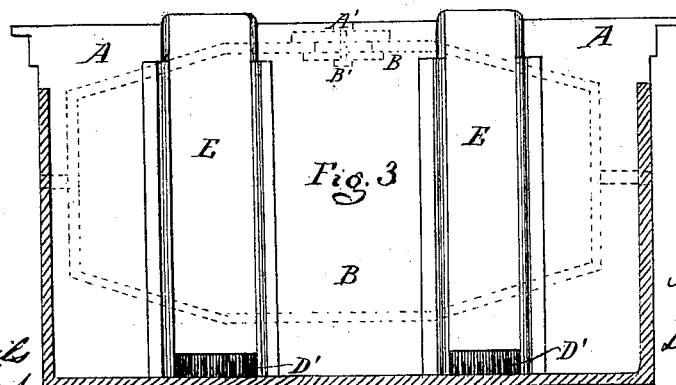

Figure 1 is a plan view. Fig. 2 is a side elevation. Fig. 3 is a vertical section on the line $x\ x$, Fig. 1. Fig. 4 is a side elevation, partly in section, of the apparatus and other apparatus connected therewith.

The same letters are used in all the figures in the designation of identical parts.

This improvement relates to an apparatus for rendering all kinds of fatty animal matter in the production of lard, tallow, grease, or oil; and my invention consists in the adaptation of a close tank or digester to the use of hot air introduced under pressure from a coil or other heating apparatus separate from said tank, and to peculiarities of construction and arrangement of parts, to be hereinafter specifically indicated.

In the annexed drawings, A is a close tank or digester, of any convenient form, made air-tight, or nearly so, and having a strength sufficient to sustain the pressure of the hot air introduced, and being properly jacketed to prevent waste of heat. Within this tank is a hollow receptacle, B, perforated with small holes over its entire surface of a size sufficient to allow the oleaginous matter to flow out, while the cracklings are retained within the receptacle. It is fitted with a man-hole and man-head, B'. A similar man-hole is formed in the top of the tank, closed, also, by a man-head at A'; and another is placed at A² at the bottom, through which the cracklings may be drawn out. I prefer to make the receptacle B taper from the middle section to the two ends, so that the cracklings shall naturally incline to the center for their more ready discharge from such receptacle. The receptacle is hung upon shafts revolving in suitable bearings in the ends of the tank, and is caused to revolve by means of a pinion or pulley, C, operated by convenient mechanism.

On one side of the tank is a receiver, D, communicating with the tank through openings D', placed at or near the bottom of the latter. The area of orifice of the discharge-apertures may be regulated by sliding valves or gates E, which may be actuated by racks and pinions, as shown in Fig. 4, or in other convenient manner. This receiver is intended to receive the oleaginous matter as it flows in a molten state from the tank, and which may be drawn therefrom through a pipe and spigot, F, opening out at the bottom of the receiver.

In rendering rancid fats it is desirable to avoid the dissemination of the offensive gases, which render such establishments as are engaged in the work nuisances to oftentimes populous neighborhoods. In such case the receiver should be made air-tight, and a pipe, G, be introduced through the cover, by means of which such gases, together with the hot air and steam generated in the process, may be conducted away and discharged into a trough containing a stream of running water, by which the steam will be condensed and the offensive matter carried away into a sewer or other convenient conduit. I have shown one arrangement convenient for this purpose that may be used in cities.

I is a hydrant, through which a small stream of water flows into a trough, H. The pipe G opens below the surface of the water in this trough, and the air will rise in bubbles through the water, while the offensive particles will be carried away with the stream without causing annoyance to any in the neighborhood.

Connected with but removed from the tank is a furnace, which may be also used for generating the steam required for driving an engine to revolve the receptacle B, and also to operate a pressure-blast, one ordinary form of which is shown at K in Fig. 4. From this pressure-blast a pipe, K', conducts the air through a heating apparatus placed in the furnace L, or in the stack thereof, where the air is heated to a temperature sufficient to render the fatty matter in the tank, and afterward to crisp the cracklings. The hot air is then conducted into the tank through the pipe H'. A second pipe, K², may be extended from the pipe K' to connect with the pipe H', which pipe, being regulated by a stop-cock, may be used to reduce the temperature of the entering blast, if found to be too hot.

This apparatus is operated in the following manner: The furnace having been fired and steam generated, if an engine is used, the receptacle B is turned until the man-hole B' is immediately below the man-hole A' in the tank. The man-heads being removed, the materials to be rendered are then to be introduced through the man-holes until the receptacle B is properly filled. When this has been done, the man-heads must be fixed in place, and the engine started. The pressure-blast will immediately force in a current of highly-heated air. The valves E should be nearly closed at first, so that the tank may become heated to the temperature necessary for rendering the materials to be acted upon. The receptacle B should be made to revolve at a speed of, say, from fifteen to thirty revolutions per minute, according to its size, so as to agitate the materials contained therein, and expose them equally to the action of the highly-heated air. As soon as the fat begins to dissolve, the oleaginous matter will flow through the apertures into the bottom of the tank, its discharge from the receptacle B being facilitated by the centrifugal action. When the melted oleaginous matter has filled the tank above the mouth of the apertures D' to such an extent as to interfere with the escape of the hot air and steam generated from the water in combination with the fatty matter employed, the valves E should be gradually raised, but so as to always leave their lower edges slightly submerged. The pressure of the blast on the surface of the melted product in the tank will cause the portion in the receiver D to maintain a level slightly higher than that in the tank; but it must be drawn off through the discharge-pipe, so as to allow the said air and steam to bubble up through it and escape into the top of the receiver. If the materials are sweet—that is, not rancid—the top of the receiver may be left open, as the vapor escaping is not offensive; but if the materials treated are rancid, then the receiver should be tightly closed, and the vapors carried into the condensing-trough. When the oleaginous matter has been fried out of the materials operated upon, the refuse should remain in the receptacle, and the heat, if necessary, increased until the cracklings are properly crisped. The oleaginous product having been drawn from the tank, the man-head B' should be removed, and the receptacle B slowly revolved until the cracklings have fallen out into the bottom of the tank, when, the man-head $A^2$ in the bottom being removed, they may be drawn out of the tank.

What I claim as my invention, and desire to secure by Letters Patent, is—

1. The combination of the pressure-blast, heating-furnace, tank, and revolving receptacle B in an apparatus for rendering fatty animal matter, substantially as set forth.

2. The combination of the tank A, receptacle B, and receiver D, arranged substantially as set forth.

3. The combination and arrangement of the tank A, receiver D, openings D', and valves E, substantially as set forth.

4. The combination of a pressure-blast, heating-furnace, the connecting-pipes, close tank A, and receiver D, arranged to receive the melted oleaginous matter as it flows from the tank, and so retain it as to maintain a pressure above that of the atmosphere in the tank, substantially in the manner set forth.

5. The combination of the pressure-blast, heater, tank, receiver, and trough for a stream of water, with the connecting-pipe, substantially as set forth.

In testimony whereof I have signed my name to this specification in the presence of two subscribing witnesses.

AMOR SMITH.

Witnesses:
R. MASON,
B. EDW. J. EILS.